May 23, 1933.  E. E. HEWITT  1,910,543
FLUID PRESSURE BRAKE
Filed Aug. 6, 1931
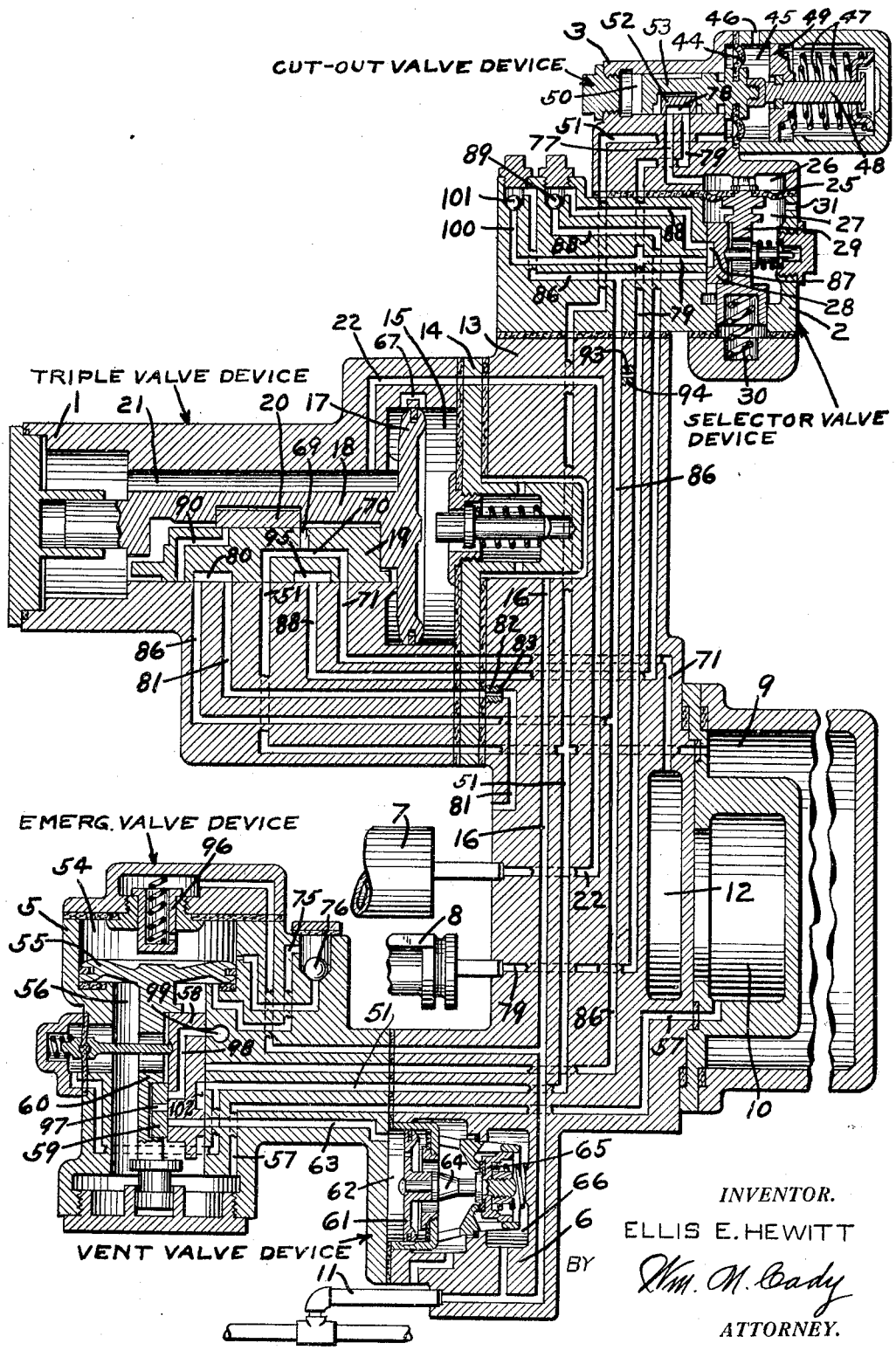
INVENTOR.
ELLIS E. HEWITT
BY Wm. M. Cady
ATTORNEY.

Patented May 23, 1933

1,910,543

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed August 6, 1931. Serial No. 555,405.

This invention relates to fluid pressure brakes, and more particularly to an automatic fluid pressure brake equipment adapted to be controlled by variations in brake pipe pressure.

With the present tendency to increase the number of cars in a train, the difficulty of controlling the brakes so as not to produce excessive shock is correspondingly increased.

It has heretofore been proposed to avoid this difficulty by holding back or preventing the brake cylinder pressure from building up at the normal rate, so that the brakes will not be applied with such force before the slack has had time to run, as to result in excessive shocks.

The principal object of my invention is to provide an improved and simplified brake equipment of the above character, by which in applying the brakes, there is effected an initial inshot of fluid under pressure from an inshot reservoir to the brake cylinder, to insure movement of the brake cylinder piston so as to cause the brake shoes to engage the wheels, then a slow build up of brake cylinder pressure while the slack of the train is running in, and finally a more rapid build up of brake cylinder pressure to cause the brakes to be applied with the desired force, after the train slack has been gathered.

Other objects and advantages will appear in the following more detailed description of the invention.

In the accompanying drawing, the single figure is a diagrammatic sectional view of a fluid pressure brake apparatus embodying my invention.

According to my invention, the equipment may comprise a triple valve device 1, a selector valve device 2, a cut-out valve device 3, an emergency valve device 5, a vent valve device 6, an auxiliary reservoir 7, a brake cylinder 8, an emergency reservoir 9, a quick action reservoir 10, a brake pipe 11 and an inshot bulb or reservoir 12.

The triple valve device 1 comprises a casing secured to a pipe bracket 13, a filling piece 14 being interposed between the casing and the pipe bracket. In the casing is provided a piston chamber 15, connected by a passage 16 to the brake pipe 11 and containing a piston 17. The piston 17 is provided with a stem 18 for operating a main slide valve 19 and a graduating valve 20, contained in valve chamber 21, said chamber being connected to the auxiliary reservoir 7, through a passage 22.

The selector valve device 2 may comprise a casing, secured to the pipe bracket 13 and containing a flexible diaphragm 25 having a chamber 26 at one side, and a valve chamber 27 at the opposite side, open to the atmosphere through a port 31 and containing a slide valve 28 adapted to be operated by said diaphragm, through a stem 29, the movement of said diaphragm in one direction being opposed by a spring 30.

The cut-out valve device 3 comprises a casing secured to the casing of the valve device 2 and containing a flexible diaphragm 44, having a chamber 45 at one side, open to the atmosphere, through a port 46, and in which are mounted coil springs 47, adapted to act on the diaphragm 44, through a stem 48 and a spring plate 49.

The valve chamber 50 at the opposite side of the diaphragm 44 is connected to the emergency reservoir 9, through a passage 51, and contains a slide valve 52, adapted to be operated by diaphragm 44, through a stem 53.

The emergency valve device 5 comprises a casing, secured to the pipe bracket 13, and having a piston chamber 54, connected to brake pipe passage 16, and containing a piston 55. The valve chamber 56, at the opposite side of piston 55, is connected, through a passage 57, with the quick action reservoir 10, and contains a main slide valve 58 and an auxiliary valve 59, adapted to be operated by the piston 55, through a stem 60.

The vent valve device 6 is disposed in the pipe bracket 13 and comprises a piston 61, having the chamber 62 at one side connected to a passage 63, leading to the seat of slide valve 58. The piston 61 is provided with a stem 64 for operating a vent valve 65, contained in valve chamber 66, which chamber is connected to brake pipe passage 16.

In operation, when the brake pipe 11 is charged with fluid under pressure in the usual manner, fluid flows from the brake pipe, through passage 16 to the piston chamber 15 of the triple valve device 1 and thence through feed passage 67 to valve chamber 21.

From valve chamber 21, fluid flows through passage 22, charging the auxiliary reservoir 7 with fluid under pressure, and also through a restricted port 69 and a cavity 70 in the main slide valve 19 to passage 51, so that the emergency reservoir 9 is charged with fluid under pressure. Cavity 70 also registers with a passage 71, leading to the initial inshot reservoir 12, so that said reservoir is also charged with fluid under pressure.

The piston chamber 54 of the emergency valve device 5 is charged with fluid under pressure from the brake pipe 11, through passage 16, and fluid flows from piston chamber 54, through a passage 75, containing a check valve 76, to the valve chamber 56. The quick action reservoir 10 is charged with fluid under pressure, from valve chamber 56, through passage 57.

The cut-out valve device 3 is employed to cut out the retarded brake application feature, when the train is operating in high speed service, as will be hereinafter more fully explained, but assuming the train is operating in low speed service, the pressure in the emergency reservoir 9 will be charged to and correspond with the lower brake pipe pressure than carried in the brake pipe, such as seventy pounds. The springs 47 are such that with seventy pounds pressure in the valve chamber 50, acting on the diaphragm 44, the pressure will not be sufficient to overcome the resistance of the springs 47, so that in low speed service, the diaphragm 44 maintains the slide valve 52 in the position shown in the drawing, in which passage 77, leading to chamber 26 of the selector valve device 2, is connected, through cavity 78, with passage 79, which leads to the brake cylinder 8.

With the triple valve device 1 in release position, the brake cylinder 8 is connected to the atmosphere by way of passage 79, passage 100, past check valve 101, passage 86, cavity 80 in main slide valve 19, and passage 81, containing a choke plug 82 having a restricted flow passage 83.

The brake cylinder being vented to the atmosphere, and the passage 79 being connected to the brake cylinder, the diaphragm chamber 26 will also be at atmospheric pressure.

With the chamber 26 at atmospheric pressure, the spring 30 maintains the diaphragm 25 and slide valve 28 in the position shown in the drawing, in which position, passage 79, leading to the brake cylinder 8, is connected, through a cavity 87 in slide valve 28, with passage 88, which leads to the seat of slide valve 19 and contains a non-return check valve 89.

When the brake pipe pressure is gradually reduced to effect a service application of the brakes, the triple valve piston 17 is moved out, first actuating the graduating valve 20 so as to uncover the service port 90 in the main slide valve 19, and then moving the main slide valve 19 until the port 90 registers with passage 86. In this position, fluid under pressure is supplied from valve chamber 21 and the auxiliary reservoir 7 to passage 86. A choke plug 94 having a restricted flow passage 93 is interposed between passages 79 and 86, so that fluid under pressure from passage 86 flows through the restricted passage 93 to passage 79, leading to the brake cylinder 8.

With the selector valve device 2 in the position shown in the drawing, fluid can only flow from the auxiliary reservoir to the brake cylinder by way of said restricted passage 93, so that the rate of build up of brake cylinder pressure is slow.

In the service position of the triple valve device, a cavity 95 in slide valve 19, connects passage 71 with passage 88, so that fluid under pressure is supplied to the brake cylinder, from the initial inshot reservoir 12, through passage 71, cavity 95, passage 88, past check valve 89, cavity 87 in valve 28, and passage 79.

Fluid under pressure supplied from the inshot reservoir 12 to the brake cylinder, is sufficient to insure that the brake cylinder piston will be moved out past the usual leakage groove in the brake cylinder, and so that the brake shoes will be brought into engagement with the wheels.

The pressure in the brake cylinder is then built up at a slow rate by flow from the auxiliary reservoir, through the restricted port 93, so that the brakes will not be applied with such force, before the slack in the train has had time to run in, as to cause excessive shocks.

It will be noted that the pressure of fluid supplied to the brake cylinder through passage 79, also acts in diaphragm chamber 26 of the selector valve device 2, since passage 79 is connected, through cavity 78 in slide valve 52, and passage 77, with said chamber, and consequently, when the pressure in the brake cylinder and in chamber 26 has been increased to a predetermined degree, slightly in excess of the pressure of spring 30, the diaphragm 25 will be flexed downwardly, moving the slide valve 28 to a position, in which communication between passage 79 and 88 is cut off and in which the passage 79 is connected directly to passage 86.

A direct flow of fluid at a greater rate from the auxiliary reservoir through passage 86 to the brake cylinder is thus provided, so that the pressure in the brake cylinder is built up more rapidly. By the time the brake cylinder pressure has been increased to a degree sufficient to flex the diaphragm 25, the slack in the train will have run in, so that the supply of fluid to the brake cylinder at a greater rate will not cause shocks.

When a gradual reduction in brake pipe pressure is effected, the emergency piston 55 is moved out until it engages the spring stop 96. In this movement, the auxiliary valve 59 is moved so that port 97 registers with port 98 in slide valve 58. The port 98 registers with an atmospheric exhaust port 99 in normal release position of the slide valve 58, so that fluid under pressure is vented from valve chamber 56 and the quick action reservoir 10, until the pressure in valve chamber 56 has been reduced to a degree slightly less than the reduced brake pipe pressure acting in piston chamber 54, when the piston 55 will be shifted so as to move the auxiliary valve 59 to lap the port 98, thus preventing the movement of the emergency valve device to emergency position, when only a gradual reduction in brake pipe pressure is effected.

If it is desired to release the brakes, the brake pipe pressure is increased in the usual manner, causing the movement of the triple valve piston 17 to release position. In releasing the brakes, fluid under pressure can flow from the brake cylinder, through passages 79 and 100 and past the check valve 101 to passage 86 and thence through cavity 80 in slide valve 19 to the atmospheric exhaust passage 81, as well as by way of the restricted service supply port 93, so that the brakes are released at the desired rapid rate.

When a sudden reduction in brake pipe pressure is effected to cause an emergency application of the brakes, the triple valve piston 17 moves out as in a service application and the operation of the triple valve device is the same as in effecting a service application of the brakes.

The emergency piston 55 is moved by the sudden reduction in brake pipe pressure to emergency position and the slide valve 58 is shifted so that the passage 63 is opened to valve chamber 56. Fluid under pressure from valve chamber 56 and therefore from the quick action chamber 10 is then supplied to piston chamber 62 of the emergency vent valve device 6. The piston 61 is then shifted so as to unseat the vent valve 65, causing fluid under pressure to be vented from the brake pipe to cause a local reduction in brake pipe pressure.

In the emergency position of the slide valve 58, a cavity 102 connects passage 51 with passage 86, so that fluid under pressure is supplied from the emergency reservoir 9, through passage 51, cavity 102 and passage 86 to the brake cylinder, in addition to the fluid pressure supplied by operation of the triple valve device.

If the train is operating in high speed service, when it is not necessary to restrict the rate of build up in brake cylinder pressure in order to avoid excessive shocks, the higher pressure carried in the bake pipe in high speed service is employed to effect the cutting out of the retarded brake cylinder pressure build up feature.

When a high brake pipe pressure is carried in the brake pipe for high speed service, such as ninety pounds, as compared with seventy pounds carried for low service, the pressure in the emergency reservoir 9 will also be ninety pounds and this higher pressure, acting in chamber 50 of the cut-out valve device 3 is sufficient to overcome the resistance of the springs 47, acting on the diaphragm 44, so that said diaphragm is flexed to the right, moving the slide valve 52 to a position in which the valve chamber 50 and the emergency reservoir 9 are connected to passage 77. Emergency reservoir pressure thus supplied to diaphragm chamber 26 operates to flex the diaphragm 25 downwardly against the pressure of spring 30, so that the slide valve 28 is moved to the position in which cavity 87 connects passage 79 with passage 86. With the selector slide valve 28 in this position, when an application of the brakes is effected, fluid under pressure is supplied from the auxiliary reservoir to the brake cylinder, by operation of the triple valve device, at the normal unrestricted rate.

It will now be seen that single valve device 2 not only serves as a selector valve device operative to cut out the retarded brake cylinder pressure build up feature under certain operating conditions, such as when operating in high speed service, but also serves as a hold back valve device, operative, when the brake cylinder pressure has been increased to a predetermined degree, to permit flow of fluid to the brake cylinder at a rapid rate, after the slack in the train has gathered.

While several illustrative embodiments of the invention have been described in detail, it is not my intention to limit its scope to these embodiments or otherwise than by the terms of the appended claims.

Having now described my invention, what I claim as new and desire to secure by Letters Patent, is:—

1. In a fluid pressure brake, the combination with a brake cylinder, an inshot reservoir normally charged with fluid under pressure, and a brake controlling valve device operable to supply fluid under pressure to the brake cylinder through a restricted communication and also from said reservoir to the brake cylinder, of a selector valve device having a normal position in which communication is established through which said brake controlling valve device supplies fluid from the inshot reservoir to the brake cylinder and a position in which communication is established to permit said controlling valve device to supply fluid to the brake cylinder at a more rapid rate, said selector valve device being subject to the pressure of fluid supplied to the brake cylinder and movable from the normal position to the other position upon a predetermined increase in the pressure of fluid supplied to the brake cylinder.

2. In a fluid pressure brake, the combination with a brake cylinder, a brake pipe, an inshot reservoir, and a triple valve device operated upon a reduction in brake pipe pressure for supplying fluid under pressure to the brake cylinder, through a restricted port and from the inshot reservoir to the brake cylinder, of a selector valve device normally establishing communication through which said triple valve device supplies fluid from the inshot reservoir to the brake cylinder and operated upon a predetermined increase in the pressure of fluid supplied to the brake cylinder by said triple valve device for establishing a connection permitting the flow of fluid under pressure from the triple valve device to the brake cylinder at a more rapid rate.

3. In a fluid pressure brake, the combination with a brake cylinder, a brake pipe and a triple valve device operated upon a reduction in brake pipe pressure for supplying fluid under pressure to the brake cylinder, through a restricted port, of a selector valve device movable, upon a predetermined increase in the pressure of fluid supplied to the brake cylinder, to a position in which communication is established to permit flow of fluid to the brake cylinder at a more rapid rate, and a valve device operated upon a predetermined increase in the pressure of fluid carried in the brake pipe for also effecting the movement of said selector valve device to said position.

4. In a fluid pressure brake, the combination with a brake cylinder, a brake pipe, and a brake controlling valve device operated upon a reduction in brake pipe pressure for supplying fluid under pressure to the brake cylinder through a restricted communication, of a selector valve device normally subject to the pressure of fluid supplied to the brake cylinder and operated upon a predetermined increase in fluid pressure to establish a communication permitting said triple valve device to supply fluid to the brake cylinder at a more rapid rate, and a valve device operated upon a predetermined increase in brake pipe pressure for also effecting an increase in fluid pressure on said selector valve device.

5. In a fluid pressure brake, the combination with a brake cylinder, a brake pipe and a brake controlling valve device operated upon a reduction in brake pipe pressure for supplying fluid under pressure to the brake cylinder through a restricted communication, of a selector valve device comprising a valve movable to a position in which communication is established through which said triple valve device supplies fluid to the brake cylinder at a more rapid rate, a movable abutment operated upon a predetermined increase in the pressure of fluid supplied to the brake cylinder for moving said valve to said position, and a valve device operated upon a predetermined increase in fluid pressure for supplying fluid under pressure to operate said abutment.

In testimony whereof I have hereunto set my hand, this 4th day of August, 1931.

ELLIS E. HEWITT.